No. 778,713. Patented December 27, 1904.

UNITED STATES PATENT OFFICE.

ALBRECHT SCHMIDT, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

VIOLET SULFUR DYE AND PROCESS OF MAKING SAME.

SPECIFICATION forming part of Letters Patent No. 778,713, dated December 27, 1904.

Application filed July 30, 1904. Serial No. 218,890.

*To all whom it may concern:*

Be it known that I, ALBRECHT SCHMIDT, Ph. D., chemist, a citizen of the Empire of Germany, residing at Höchst-on-the-Main, Germany, have invented certain new and useful Improvements in Violet Sulfur Dyes and Processes of Making Same, of which the following is a specification.

If phenosafraninon (obtained, for instance, by decomposing phenosafranin) be heated with sulfur to a high temperature, (190° centigrade,) a vivid evolution of hydrogen sulfid occurs. The product thus obtained is soluble in alkali sulfids and in this solution dyes cotton powerful violet shades of good fastness. This result is remarkable in many respects. Thus, for instance, safranol, corresponding with safraninon, yields when heated with sulfur alone no sulfurized dyestuff.

Example: Ten parts, by weight, of finely-pulverized safraninon are introduced at about 115° to 120° centigrade into thirty parts, by weight, of melted sulfur. The temperature is gradually raised while stirring to 190° centigrade and maintained until no further increase of the dyestuff occurs. When cold, the product is finely pulverized, and on being dissolved in sodium sulfid it may be directly used for dyeing. It thus dyes cotton violet shades, which treated with copper become bluer and their fastness increased. When oxidizing on the fiber—for instance, by means of steaming, hydrogen peroxid, &c.—the dyeings become of a more vivid hue. The product of sulfonation is insoluble in water, and nearly insoluble in alcohol. In concentrated sulfuric acid it dissolves with a violet-blackish color. In alkali sulfids it is soluble with a violet-red color. From this solution it is again precipitated by acids.

The proportions of safraninon and sulfur may be greatly varied; also the temperature by heating, for instance, for some time at 150° to 180° centigrade. A somewhat redder shade is then obtained. When heating, partly indifferent solvents, such as naphthalene or such as take part in the formation of the dyestuff, may be added, like anilin, dimethylanilin, phenol, by which bluer products are obtained. The operation may be carried out in an open or closed vessel.

Having now described my invention, what I claim is—

1. The herein-described process for the manufacture of a violet sulfurized dyestuff, which consists in heating safraninon with sulfur at a high temperature, substantially as set forth.

2. As a new product, a violet sulfurized dyestuff, obtained by heating together safraninon and sulfur, being when dry and pulverized a violet-black powder insoluble in water, soluble in concentrated sulfuric acid with a violet-blackish color, in alkali sulfids with a violet-red color.

In testimony that I claim the foregoing as my invention I have signed my name in presence of two subscribing witnesses.

ALBRECHT SCHMIDT.

Witnesses:
ALFRED BRISBOIS,
BERNHARD LEYDECKER.